(12) United States Patent
Wellhoefer et al.

(10) Patent No.: US 8,504,237 B2
(45) Date of Patent: Aug. 6, 2013

(54) DEVICE, METHOD, AND CONTROL UNIT FOR IDENTIFYING A SIDE IMPACT, AND PRESSURE SENSOR

(75) Inventors: Matthias Wellhoefer, Stuttgart (DE); Boris Adam, Gaeufelden (DE); Volker Frese, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 708 days.

(21) Appl. No.: 12/227,990

(22) PCT Filed: Jun. 13, 2007

(86) PCT No.: PCT/EP2007/055821
§ 371 (c)(1),
(2), (4) Date: Apr. 15, 2009

(87) PCT Pub. No.: WO2008/017535
PCT Pub. Date: Feb. 14, 2008

(65) Prior Publication Data
US 2009/0271065 A1 Oct. 29, 2009

(30) Foreign Application Priority Data
Aug. 8, 2006 (DE) .......................... 10 2006 036 960

(51) Int. Cl.
*G06F 7/00* (2006.01)
(52) U.S. Cl.
USPC .............. 701/29.2; 701/1; 701/300; 600/485; 600/490; 600/493; 600/494; 600/500; 73/706; 73/724; 73/727; 73/862.381
(58) Field of Classification Search
USPC ............... 701/34, 1, 29.2, 300; 600/485, 490, 600/493, 494, 499, 500, 520; 303/113.4, 303/122.01; 73/706, 724, 727, 272, 862.831; 338/4, 42; 340/626; 152/416; 137/487.5; 188/318
See application file for complete search history.

(56) References Cited

U.S. PATENT DOCUMENTS

| | | | |
|---|---|---|---|
| 5,758,301 A | 5/1998 | Saito et al. | |
| 7,075,448 B2* | 7/2006 | Rettig et al. | 340/661 |
| 7,221,299 B2* | 5/2007 | Bjornsen | 341/131 |
| 7,305,863 B2* | 12/2007 | Recknagel et al. | 73/1.38 |
| 2009/0001976 A1* | 1/2009 | Cech et al. | 324/228 |

FOREIGN PATENT DOCUMENTS

| | | |
|---|---|---|
| DE | 102 10 925 | 10/2003 |
| DE | 103 08 652 | 9/2004 |
| DE | 10 2005 041913 | 3/2006 |
| WO | WO 03/078954 | 9/2003 |
| WO | WO 2005/012924 | 2/2005 |

OTHER PUBLICATIONS

Jarman, A Brief Introduction to Sigma Delta Conversion, 1995, Internet. p. 1-7.*

* cited by examiner

*Primary Examiner* — McDieunel Marc
(74) *Attorney, Agent, or Firm* — Kenyon & Kenyon LLP

(57) ABSTRACT

In device for side impact recognition in a vehicle, at least one pressure sensor system that produces a signal is provided in a side part of the vehicle, and an evaluation circuit is provided that recognizes a side impact as a function of the signal. In addition, a test device is provided for the at least one pressure sensor system, the at least one test device being configured such that the at least one test device oversamples the signal and then filters it in order to produce a test signal, the test device comparing the signal with a reference value and, as a function of this comparison, recognizing the operability of the at least one pressure sensor system.

16 Claims, 5 Drawing Sheets

DEVICE, METHOD, AND CONTROL UNIT FOR IDENTIFYING A SIDE IMPACT, AND PRESSURE SENSOR

BACKGROUND OF THE INVENTION

1. Field of the Invention

The present invention relates to a device, a method, a control device for side impact recognition, and a pressure sensor.

2. Description of Related Art

From published German patent document DE 102 10 925, a method is already known for testing the operability of a pressure sensor. In this method, the measurement values of the pressure sensor that is to be tested are compared to measurement values of another pressure sensor over a defined observation time period. The pressure sensor is recognized as defective if its measurement values differ by more than a prespecified amount from the measurement values of the at least one additional pressure sensor.

BRIEF SUMMARY OF THE INVENTION

The device according to the present invention, the method according to the present invention, the control device for side impact recognition in a vehicle according to the present invention, and the pressure sensor according to the present invention provide the advantage that the additional pressure sensor can be avoided by oversampling, and then filtering, the signal of the pressure sensor system to be tested. The resulting test signal is compared to a reference value, and the operability of the at least one pressure sensor system is recognized as a function of this comparison. Advantageously, the oversampling and the subsequent filtering can achieve a high resolution, so that the acceleration sensitivity of the pressure sensor can be used. This is because a pressure membrane, preferably used as a sensor element, always has a mass inertia and thus an acceleration sensitivity. According to the present invention, this acceleration sensitivity is used, on the basis of the acceleration that occurs during driving operation of the vehicle, to test the movement of the membrane and the entire subsequent signal path. The mass inertia of the pressure sensor should however be as small as possible, because in case of a crash the pressure signal should not be damaged. For example, mass inertias of the pressure sensors used in passenger protection systems result in acceleration sensitivity values of 3-10 mbar/100 g. In order to recognize an acceleration of 0.1 g, a resolution of 0.003-0.1 mbar is required. With the aid of the test device according to the present invention, it is possible to achieve this resolution, even for less dynamic signals. The accelerations that occur during normal driving operation tend to last somewhat longer than those that occur in the case of a crash.

An acceleration process of 0-100 km/h in 20 seconds results in an acceleration of 0.1-0.2 g. A full braking from 100 km/h over 50 meters lasts about 3.6 seconds, with a negative acceleration of −0.8 g.

The device according to the present invention makes possible a resolution of 0.1 g in a frequency range of 0.1-10 hertz. Depending on the driving dynamics, this signal would be compared with the other pressure sensor situated opposite, or with the central acceleration sensors.

The device according to the present invention can have at least one pressure sensor and a control device that evaluates the signal of the pressure sensor. However, it is possible for the device to form a compact unit and to be installed in the side of the vehicle. Additional pressure sensors in the side parts can then also be installed as a device, or they can be connected to the device, so that the device alone carries out the evaluation. This also holds for the test device.

With its sensor element, the pressure sensor produces the signal that is supplied to the sigma-delta converter. In this way, a one-bit measurement signal is produced. Furthermore, the pressure sensor has a filter that causes an increase in the resolution of the one-bit measurement signal, thus producing the test signal. This signal can then be transmitted to a control device in order to control passenger protection devices.

The method according to the present invention is executed on the control device. The interface can be realized as hardware or as software.

It is particularly advantageous that the test device according to the present invention has at least one SIGMA-DELTA converter for oversampling and filtering. The SIGMA-DELTA converter technology is particularly suitable for this purpose and is easy to implement.

Advantageously, the reference value with which the test signal is compared is stored in a storage device, so that the reference value is preset. Alternatively, it is possible for the reference value to be produced by a sensor system.

In addition, it is advantageous that the pressure sensor system has a measurement bridge in order to produce the signal. This makes possible a particularly secure signal production, provided with a large signal level swing.

Advantageously, the SIGMA-DELTA converter is configured for the production of a measurement signal, a low-pass and/or band-pass filtering being provided for the one-bit measurement signal.

For the production of the signal, a low-pass filtering is advantageously provided, and an additional band-pass filtering is then provided for the production of the test signal.

DETAILED DESCRIPTION OF THE INVENTION

A pressure sensor system is used for impact sensing of side impacts in vehicles by situating the pressure sensor system in side parts of the vehicle, which system very quickly produces a signal when there is an adiabatic pressure increase caused by an impact. In order to ensure functioning of the pressure sensor system over a long period of time, a continuous monitoring of the operability of the pressure sensor system is necessary. For this purpose, according to the present invention a test device is proposed that carries out an oversampling and a subsequent filtering of the signal produced by the pressure sensor system. The SIGMA-DELTA converter technology is particularly well-suited for this purpose.

An analog-digital converter that operates according to the SIGMA-DELTA principle converts, in two steps, an analog signal into a digital signal having a prespecified word length B. In the first stage, called the modulator, the sampling of the analog signal having bandwidth $f_B$ takes place with a high oversampling rate $$OSR = \frac{f_A}{2f_B},$$

where $f_A$ is the sampling frequency. In the modulator, the difference between the input and the output signal over one or more feedback loops is formed and integrated. The result of the integration is evaluated by a quantizer. Given a sufficiently high oversampling, between two sampling time points there occurs only a slight signal change, so that it is possible to use a simple binary quantizer, i.e. a one-bit converter. The resulting serial bit sequence represents a pulse-density-modulated signal having the high sampling frequency $f_A$. Respectively succeeding bits of this data stream contain the information that is required according to the Nyquist criterion in order to reliably describe a signal having frequency $f_B$. This serial bit sequence forms the signal that is communicated to the second module, a digital filter. Its task is to suppress the resulting high-frequency noise portions, and to convert the serial data stream into the digital word having length B bits, outputted with the frequency of twice the bandwidth of the input signal $f_N=2\cdot f_W$ (Nyquist frequency).

Figure 5:
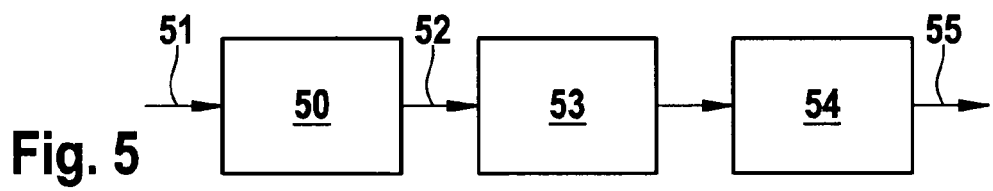
FIG. 5 shows a block diagram of a SIGMA-DELTA converter.

FIG. 5 shows, in a first block diagram, the modules of a SIGMA-DELTA converter. In a modulator 50, an analog input signal is inputted with frequency $f_B$ 51. From this, as indicated above, modulator 50 forms a serial bit sequence having high sampling frequency $f_A$, designated with reference character 52. In block 53 there takes place the digital filtering that suppresses the high-frequency noise portions, and outputs the serial data stream into the corresponding digital words having the frequency of twice the bandwidth of the input signal, so that in block 54 the decimator outputs this digital word.

Figure 6:
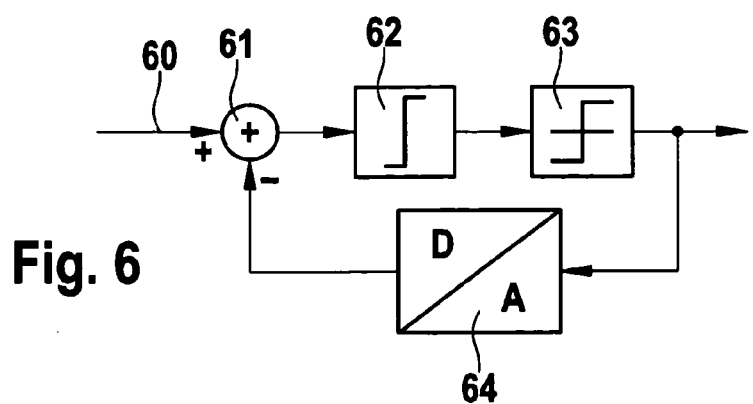
FIG. 6 shows a block diagram of a SIGMA-DELTA modulator.

FIG. 6 shows, in another block diagram, the design of the SIGMA-DELTA modulator, in which the analog signal 60 is supplied to an adder 61, in which a signal fed back from a digital-analog converter 64 is subtracted from analog signal 60. The resulting signal is supplied to an integrator 62 and then to a quantizer 63. Digital-analog converter 64 is realized as a one-bit converter. The output signal, converted back to analog, represents either the maximum input voltage or the minimum input voltage, and thus simultaneously prespecifies the input voltage range of the converter. The larger the input signal is, the more often the comparator outputs a 'one.' Given a low input level, the outputted values are predominantly zeroes. If the input voltage is in the middle between maximum and minimum voltage, the output constantly alternates between zero and one. As a result of the integrating modulator function, the magnitude of the input voltage is contained in the mean value of the outputted serial bit stream. This represents a relative value with regard to the two boundary values of the maximum and minimum voltage. The constancy and the precision of the output level of digital-analog converter 64 are thus decisive with respect to the absolute precision of the formed mean value.

Figure 7:
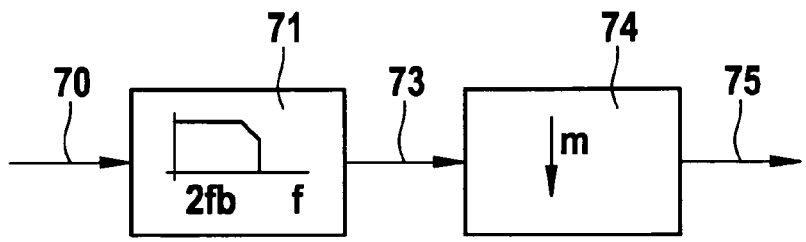
FIG. 7 shows a block diagram of a digital part of a SIGMA-DELTA converter.

FIG. 7 shows a digital part of the SIGMA-DELTA converter, which includes a low pass filter 71 for suppressing the high-frequency portion in the quantization noise, and a decimator 74 for the reduction of the sampling frequency of the output signal to the minimally doubled bandwidth of the input signal. Here, the serial bit stream of the modulator output is converted into digital words having word length B, as formed in standard analog-digital converters. In the simplest case, low-pass filter 71 can be described by the formation of the floating mean value over the output signal of the modulator. The reduction of the sampling rate corresponds to the removal of each $m^{th}$ value of the filter output signal. This is then signal 75. The possible size of the length of the data word results from the signal-noise ratio achievable in the modulator, as well as additional noise portions possibly caused in the digital part.

Figure 8:
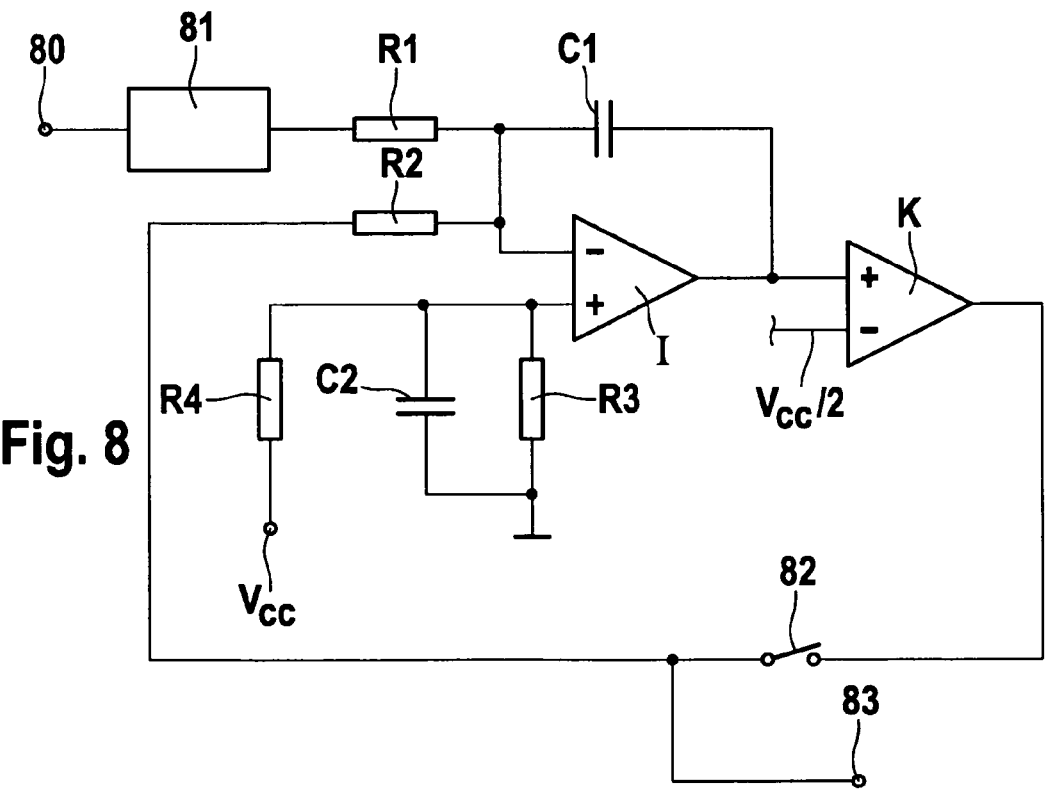
FIG. 8 shows a schematic diagram of a SIGMA-DELTA converter.

FIG. 8 shows a simple realization of a SIGMA-DELTA converter. The analog input signal is fed in at input connection 80. For adaptation, there then follows an impedance converter 81 that is followed by a pre-resistance R1. Resistor R1 is connected at a capacitor C1 to the negative input of a comparator I, and is connected to a resistor R2. A prespecified voltage VCC is connected to the positive input of operational amplifier I via a resistor R4. In addition, there is connected to this positive input a parallel circuit of a capacitor C2 and a resistor R3, which are connected to ground at the other side. Operational amplifier I is switched as an integrator by this connection pattern. On the other side, resistor R2 is connected to a switch 82, and to an output 83 that leads to the digital filter. On the other side, switch 82 is connected to the output of a comparator K whose positive output is connected to capacitor C1 and to the output of operational amplifier I. Fixed voltage value VCC is half-connected to the negative input of comparator K. Thus, comparator K and switch 82 form a one-bit quantizer.

Figure 1:
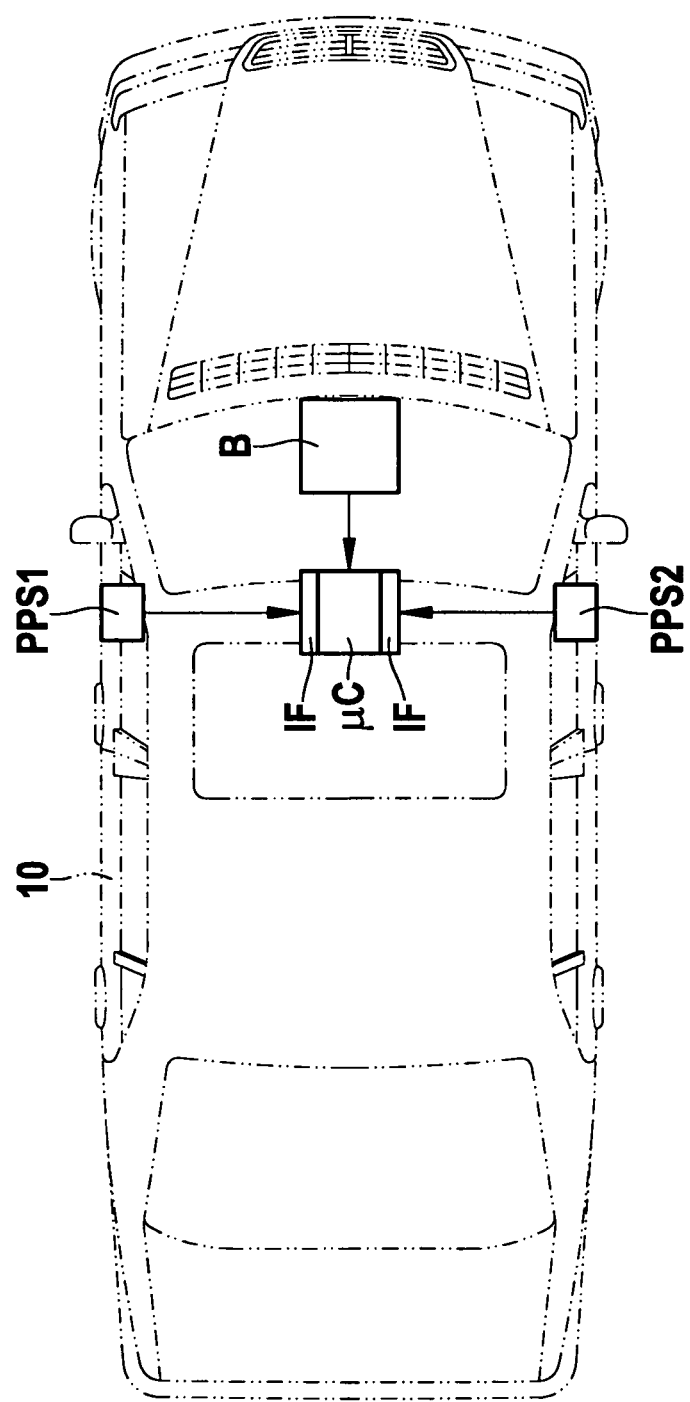
FIG. 1 shows a configuration of the device according to the present invention in the vehicle.

FIG. 1 shows a configuration of the device according to the present invention. A microcontroller μC as an evaluation circuit receives, via an interface IF, signals from pressure sensor systems PPS1 and PPS2, which are respectively situated on opposite side parts of the vehicle, in order to determine an adiabatic pressure increase in the side part in the case of an impact. In the present case, interface IF is fashioned as an integrated switching circuit. It can alternatively be fashioned from individual modules, or as a software module on microcontroller μC. Interface IF thus provides the signals from the pressure sensor system.

In addition, vehicle 10 has an acceleration sensor system B that also supplies its signal to microcontroller μC. Microcontroller μC receives from pressure sensor systems PPS1 and PPS2 the test signal produced by the sigma-delta converter. That is, the sigma-delta converter is situated in pressure sensor PPS1 or PPS2. Alternatively, it is possible for this sigma-delta converter also to be situated in a control device in which microcontroller μC is situated. Acceleration sensor system B is used for comparison purposes if a stored value is not used. Acceleration sensor system B can be situated in a control device, or can also be situated externally in a sensor box, or in distributed fashion in vehicle 10.

Figure 2:
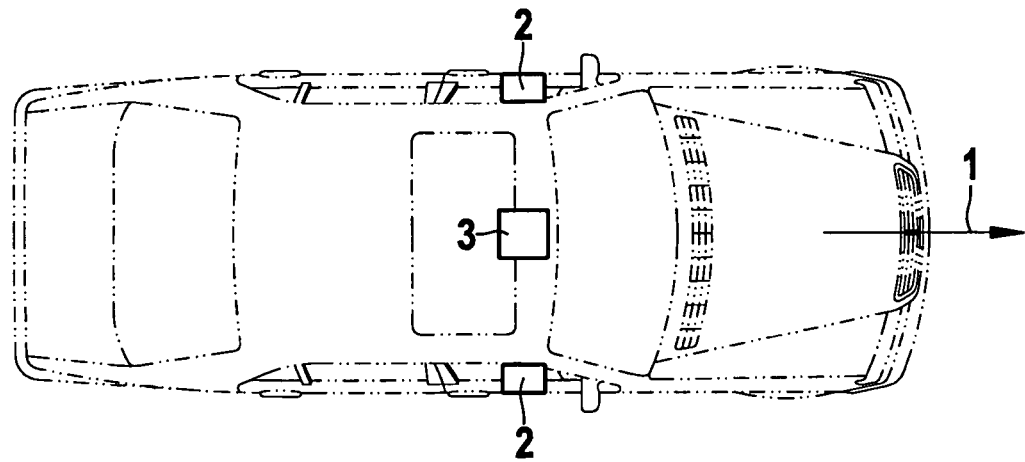
FIG. 2 and FIG. 3 show various directions of acceleration.
Figure 3:
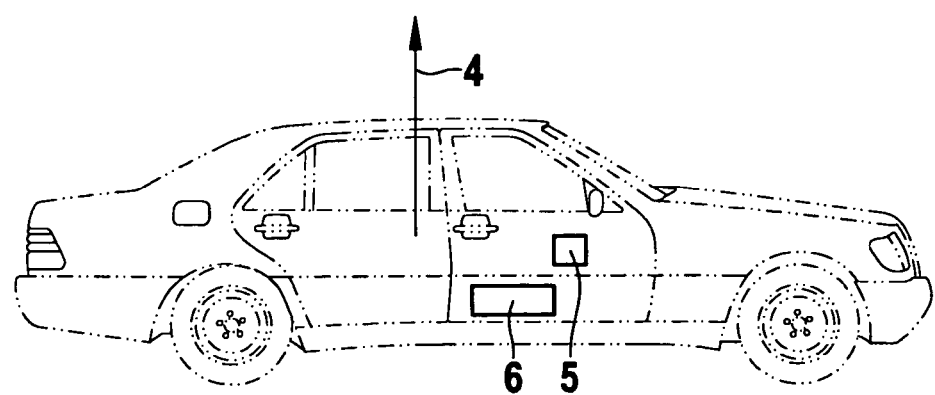

FIGS. 2 and 3 show possible situations of the device according to the present invention. In FIG. 2, the surfaces show normal vectors 1 of the pressure membrane in direction of travel 1. The acceleration produced by the driving dynamics is detected with the aid of the acceleration sensitivity and pressure sensors 2, and the signals from the pressure sensors are compared either to one another or to acceleration sensors in airbag control device 3. FIG. 3 shows a system for detecting signals in the Z direction 4, such as those that occur when traveling on bad stretches of road. Again, the acceleration sensitivity signals of pressure sensors 5 are compared with one another or with an acceleration measurement in airbag control device 6. For this system, the bandpass filter has to be adapted, because these signals have a greater dynamic range and amplitude.

If present, the signals for the braking control device (ESP) can also be used, because these are already present in high-resolution form (10-50 mg).

Figure 4:
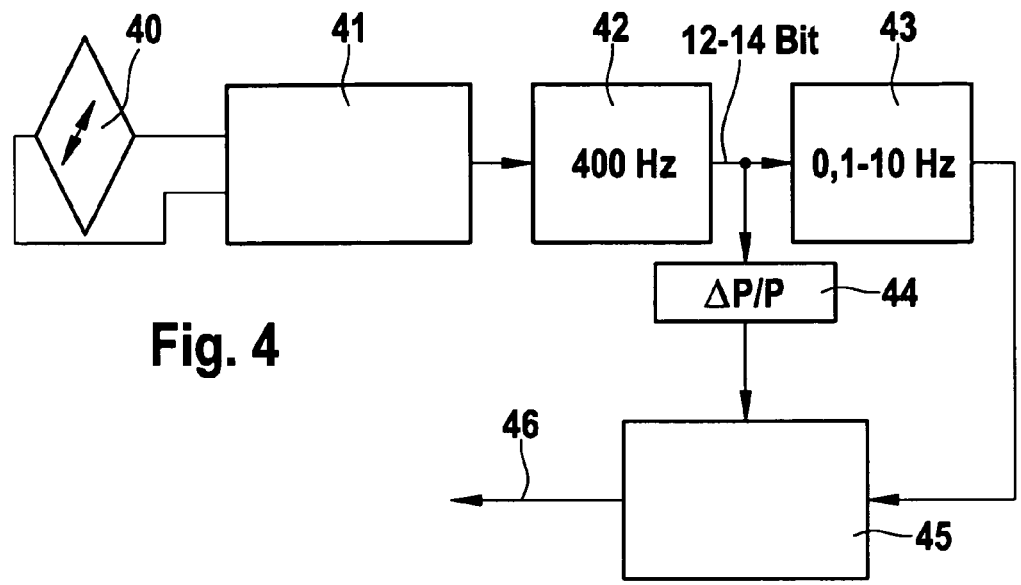
FIG. 4 shows a block diagram of a pressure sensor.

FIG. 4 shows a possible design of the pressure sensor, divided into functional blocks. The original pressure signal is recorded with the aid of a measurement bridge 40. A sigma-delta converter 41 converts the resulting voltage signal into a high-frequency one-bit measurement signal. The subsequent low-pass filtering 42 increases the resolution. After the 400 hertz low-pass filtering, the signal has a resolution of 12-14 bits, corresponding to a resolution of approximately 0.1-0.5 mbar. This signal is used to calculate the useful signal $$\frac{\Delta P}{P}.$$

A further bandpass filtering 43 increases the resolution, so that the resolution of 0.003-0.01 mbar is achieved. Because bandpass 43 also removes the direct portion of the signal, i.e. the ambient absolute pressure, only a small representation width of the test signal is still required, which is here indicated for example by 4 bits. The useful signal is designated here by reference character 44.

In the normal case, a logic circuit 45 with an interface to the airbag control device is then alternating useful signal and test signal communicated to the control device via line 46. The airbag control device now compares either the signals of the two pressure sensors to one another or to the acceleration measured in the control device, and can thus plausibilize the signal via the overall signal chain of the pressure sensor.

In case of a crash, i.e. the case in which the useful signal crosses a threshold, only the useful signal is then transmitted.

The rotation of the membrane in the direction of travel or in the Z direction has the advantage that the accelerations that occur during a side crash no longer act perpendicular to the membrane, so that the degradation of crash signal 44 due to the acceleration sensitivity of the membrane is significantly reduced.

Figure 9:
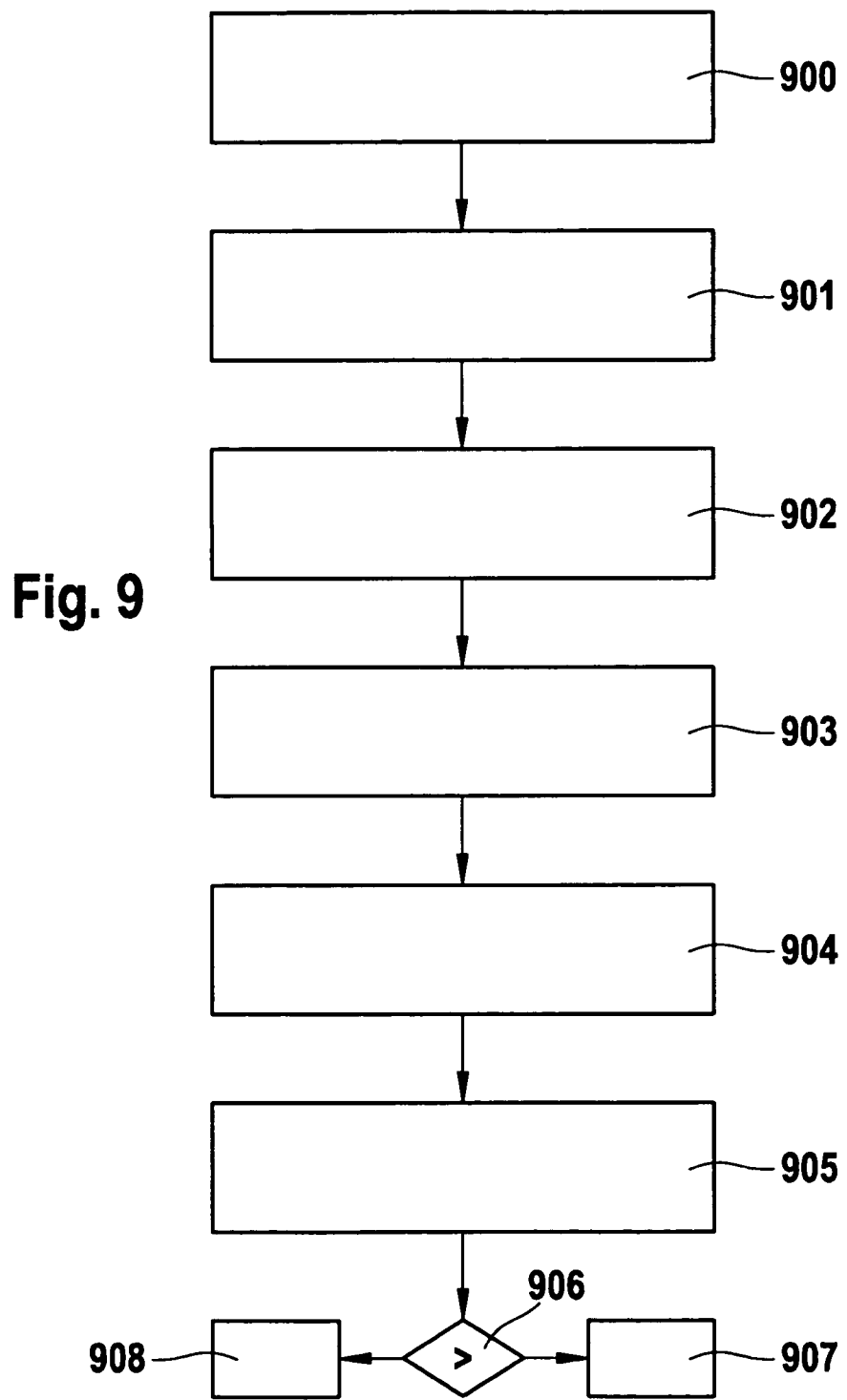
FIG. 9 shows a flow diagram of a method according to the present invention.

FIG. 9 shows a flow diagram of the method according to the present invention on the device according to the present invention. In method step 900, the measurement bridge produces the pressure signal. In method step 901, the sigma-delta converter produces a high-frequency one-bit data stream, which in method step 902 is subjected to a low-pass filtering in order to increase the resolution. After the low-pass filtering, the useful signal is then present. A further bandpass filtering in method step 903 produces the test signal, so that in method step 904 the useful signal and the test signal can then be communicated in alternating fashion to the control device. In the control device, a provision of this signal through interface IF takes place. In method step 905, a comparison then takes place in the control device, in order to test in method step 906 whether the comparison results in a value that is higher than a prespecified reference value. If this is the case, in method step 907 a warning is emitted, for example by controlling a display such as a light. If this is not the case, the method terminates in method step 908. Instead of a light, a corresponding display can also be made on a display device in a vehicle.

What is claimed is:

1. A device for detecting side impact in a vehicle, comprising:

at least one pressure sensor system in at least one side part of the vehicle, wherein the at least one pressure sensor system is configured to produce a signal;
at least one evaluation circuit configured to recognize a side impact as a function of the signal from the at least one pressure sensor system;
at least one test device configured to test an operability of the at least one pressure sensor system, wherein the at least one test device is configured to over-sample the signal from the at least one pressure sensor system and then filter the over-sampled signal in order to produce a test signal, and wherein the at least one test device is further configured to compare the test signal to a predefined reference value and determine the operability of the at least one pressure sensor system based on the comparison;
wherein the over-sampling and filtering of the signal is sufficient to achieve a high resolution.

2. The device as recited in claim 1, wherein the test device has at least one sigma-delta converter for over-sampling and filtering.

3. The device as recited in claim 2, further comprising:
a storage device configured to store the reference value.

4. The device as recited in claim 2, further comprising:
an additional sensor system configured to produce the reference value.

5. The device as recited in claim 2, wherein the at least one pressure sensor system has a measurement bridge for producing the signal.

6. The device as recited in claim 2, wherein the sigma-delta converter is configured to: a) produce a one-bit measurement signal; and b) provide at least one of a low-pass filtering and a band-pass filtering for the one-bit measurement signal.

7. The device as recited in claim 6, wherein after the low-pass filtering, the signal is present, and wherein after the band-pass filtering, the test signal is present.

8. The device as recited in claim 1, further comprising:
a storage device configured to store the reference value;
wherein the test device has at least one sigma-delta converter for over-sampling and filtering, and
wherein the at least one pressure sensor system has a measurement bridge for producing the signal.

9. The device as recited in claim 8, wherein the sigma-delta converter is configured to: a) produce a one-bit measurement signal; and b) provide at least one of a low-pass filtering and a band-pass filtering for the one-bit measurement signal.

10. The device as recited in claim 9, wherein after the low-pass filtering, the signal is present, and wherein after the band-pass filtering, the test signal is present.

11. The device as recited in claim 1, further comprising:
an additional sensor system configured to produce the reference value;
wherein the test device has at least one sigma-delta converter for over-sampling and filtering, and
wherein the at least one pressure sensor system has a measurement bridge for producing the signal.

12. The device as recited in claim 11, wherein the sigma-delta converter is configured to: a) produce a one-bit measurement signal; and b) provide at least one of a low-pass filtering and a band-pass filtering for the one-bit measurement signal.

13. The device as recited in claim 12, wherein after the low-pass filtering, the signal is present, and wherein after the band-pass filtering, the test signal is present.

14. A pressure sensor system, comprising:
a sensor element configured to produce a signal;

a sigma-delta converter configured to produce a one-bit measurement signal on the basis of the signal from the sensor element;

a low-pass filter and a band-pass filter configured to filter the one-bit measurement signal in order to produce a test signal; and a transmitter module configured to send out the test signal.

15. A method for detecting side impact in a vehicle, the method comprising:

generating a signal by a pressure sensor system;

determining by a processor a side impact as a function of the signal;

over-sampling the signal and subsequent filtering the over-sampled signal in order to produce a test signal;

comparing the test signal to a predefined reference value; and ascertaining an operability of the pressure sensor system depending on the comparison;

wherein the over-sampling and filtering of the signal is sufficient to achieve a high resolution.

16. A control device for detecting side impact in a vehicle, comprising:

an interface configured to provide a signal of at least one pressure sensor system;

at least one evaluation circuit configured to recognize a side impact as a function of the signal of the at least one pressure sensor system;

over-sampling the signal by at least one test device;

filtering the over-sampled signal in order to produce a test signal;

comparing the test signal to a predefined reference value; and ascertaining an operability of the at least one pressure sensor system based on the comparison;

wherein the over-sampling and filtering of the signal is sufficient to achieve a high resolution.

* * * * *

UNITED STATES PATENT AND TRADEMARK OFFICE
CERTIFICATE OF CORRECTION

PATENT NO. : 8,504,237 B2
APPLICATION NO. : 12/227990
DATED : August 6, 2013
INVENTOR(S) : Wellhoefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this
Fifteenth Day of September, 2015

Michelle K. Lee
*Director of the United States Patent and Trademark Office*